United States Patent
Lee et al.

(10) Patent No.: US 8,351,846 B2
(45) Date of Patent: Jan. 8, 2013

(54) METHOD AND APPARATUS FOR MANAGING CONNECTION IDENTIFIERS IN A MULTI-HOP RELAY WIRELESS ACCESS COMMUNICATION SYSTEM

(75) Inventors: Sung-Jin Lee, Seoul (KR); Jung-Je Son, Seongnam-si (KR); Hyoung-Kyu Lim, Seoul (KR); Yeong-Moon Son, Anyang-si (KR); Hyun-Jeong Kang, Seoul (KR); Pan-Yuh Joo, Seoul (KR); Jun-Young Jung, Yongin-si (KR)

(73) Assignee: Samsung Electronics Co., Ltd (KR)

( * ) Notice: Subject to any disclaimer, the term of this patent is extended or adjusted under 35 U.S.C. 154(b) by 798 days.

(21) Appl. No.: 11/649,310

(22) Filed: Jan. 3, 2007

(65) Prior Publication Data

US 2007/0153698 A1 Jul. 5, 2007

(30) Foreign Application Priority Data

Jan. 3, 2006 (KR) .................. 10-2006-0000721

(51) Int. Cl.
- *H04J 3/24* (2006.01)
- *H04W 4/00* (2009.01)
- *H04L 12/66* (2006.01)
- *H04L 12/28* (2006.01)
- *H04L 12/56* (2006.01)

(52) U.S. Cl. ......... 455/7; 455/552.1; 455/453; 370/349; 370/352; 370/353; 370/331; 370/400

(58) Field of Classification Search .............. 370/349, 370/352, 353, 331, 400; 455/552.1, 453
See application file for complete search history.

(56) References Cited

U.S. PATENT DOCUMENTS

| | | | |
|---|---|---|---|
| 7,035,287 B2 * | 4/2006 | Tourunen et al. | 370/477 |
| 7,164,665 B2 * | 1/2007 | Tourunen | 370/329 |
| 7,362,722 B2 | 4/2008 | Otsuka | |
| 7,406,518 B2 * | 7/2008 | Lasserre | 709/225 |
| 7,542,439 B2 * | 6/2009 | Rubin | 370/315 |
| 7,881,276 B2 * | 2/2011 | Hsu et al. | 370/341 |
| 7,933,236 B2 * | 4/2011 | Wang et al. | 370/328 |
| 2002/0093938 A1 * | 7/2002 | Tourunen | 370/349 |

(Continued)

FOREIGN PATENT DOCUMENTS

EP 1 610 577 12/2005

(Continued)

OTHER PUBLICATIONS

Kevin Baum et al.; Transparent Uplink Relaying for OFDMA; IEEE 802.16 Broadband Wireless Access Working Group, Nov. 4, 2004.

(Continued)

*Primary Examiner* — Bobbak Safaipour
(74) *Attorney, Agent, or Firm* — The Farrell Law Firm, P.C.

(57) ABSTRACT

A CID management method and apparatus in a multi-hop relay BWA communication system are provided. A BS combines data destined for an RS and data to be relayed to an MS via the RS in a payload, distinguishing the data by CIDs, attaches a relay CID to the payload, and sends the payload with the relay CID to the RS. Among the data of the payload, the RS processes its data and relays to the MS the data destined for the MS by distinguishing them by the CIDs.

24 Claims, 7 Drawing Sheets

U.S. PATENT DOCUMENTS

| | | |
|---|---|---|
| 2005/0201269 A1 | 9/2005 | Shim et al. |
| 2005/0232183 A1 | 10/2005 | Sartori et al. |
| 2005/0265360 A1* | 12/2005 | Kim et al. ............ 370/400 |
| 2005/0286451 A1 | 12/2005 | Kim et al. |
| 2007/0072604 A1* | 3/2007 | Wang ............ 455/428 |
| 2007/0097945 A1* | 5/2007 | Wang et al. ............ 370/349 |
| 2008/0002631 A1* | 1/2008 | Ramachandran ............ 370/338 |
| 2008/0025280 A1* | 1/2008 | Hsu et al. ............ 370/341 |
| 2008/0285501 A1* | 11/2008 | Zhang et al. ............ 370/315 |
| 2009/0073916 A1* | 3/2009 | Zhang et al. ............ 370/315 |
| 2009/0074189 A1* | 3/2009 | Ryu et al. ............ 380/277 |
| 2009/0088164 A1* | 4/2009 | Shen et al. ............ 455/436 |
| 2009/0097433 A1* | 4/2009 | Shen et al. ............ 370/315 |
| 2009/0097449 A1* | 4/2009 | Jin ............ 370/331 |
| 2009/0109960 A1* | 4/2009 | Chen et al. ............ 370/352 |
| 2009/0141668 A1* | 6/2009 | Zhang et al. ............ 370/315 |
| 2010/0027457 A1* | 2/2010 | Okuda ............ 370/315 |
| 2010/0046413 A1* | 2/2010 | Jin et al. ............ 370/315 |
| 2010/0061339 A1* | 3/2010 | Kim et al. ............ 370/331 |
| 2010/0087196 A1* | 4/2010 | Lee et al. ............ 455/436 |

FOREIGN PATENT DOCUMENTS

| | | |
|---|---|---|
| EP | 1 770 879 | 4/2007 |
| JP | 2005-086350 | 3/2005 |
| JP | 2005-229296 | 8/2005 |
| KR | 10-2004-0044595 | 5/2004 |
| RU | 99120713 | 3/1998 |
| RU | 2249916 | 4/2005 |
| WO | WO 96/19887 | 6/1996 |
| WO | WO 98/39936 | 9/1998 |

OTHER PUBLICATIONS

Yu-Ching Hsu; Mobility Management for Mobile Multi-hop Relay Networks; Sep. 9, 2005.

Kevin Baum et al., "Transparent Uplink Relaying for OFDMA", IEEE 802.16 Broadband Wireless Access Working Group, Nov. 4, 2004.

* cited by examiner

METHOD AND APPARATUS FOR MANAGING CONNECTION IDENTIFIERS IN A MULTI-HOP RELAY WIRELESS ACCESS COMMUNICATION SYSTEM

PRIORITY

This application claims priority under 35 U.S.C. §119 to an application filed in the Korean Intellectual Property Office on Jan. 3, 2006 and assigned Serial No. 2006-721, the contents of which are incorporated herein by reference.

BACKGROUND OF THE INVENTION

1. Field of the Invention

The present invention relates generally to a multi-hop relay cellular system. More particularly, the present invention relates to a method and apparatus for managing Connection Identifiers (CIDs) in a multi-hop relay Broadband Wireless Access (BWA) communication system.

2. Description of the Related Art

Provisioning of services with different Quality of Service (QoS) levels at about 100 Mbps to users is an active study area for a future-generation communication system called a $4^{th}$ Generation (4G) communication system. Particularly, active research is on going in the area of mobility and high-speed, high-Quality of Service (QoS) services in BWA communication system such as Wireless Local Area Network (WLAN) and Wireless Metropolitan Area Network (WMAN). The Institute of Electrical and Electronics Engineers (IEEE) is a major driving force in this area as exemplified by 802.16d and IEEE 802.16e.

The IEEE 802.16d and IEEE 802.16e communication systems adopt Orthogonal Frequency Division Multiplexing/Orthogonal Frequency Division Multiple Access (OFDM/OFDMA) for physical channels. IEEE 802.16d considers only fixed Subscriber Stations (SSs), i.e. a single-cell structure with no regard to mobility of SSs. In contrast, IEEE 802.16e supports the SS' mobility to the IEEE 802.16d communication system. Hereinafter, a Mobile SS is called an MS.

FIG. 1 illustrates the configuration of a typical BWA communication system.

Referring to FIG. 1, the BWA communication system is configured in a multi-cell structure. Specifically, it is comprised of cells 100 and 150, BSs 110 and 140 for managing cells 100 and 150, respectively, and a plurality of MSs 111, 113, 130, 151 and 153. Signaling is carried out in OFDM/OFDMA between BSs 110 and 140 and MSs 111, 113, 130, 151 and 153. Among MSs 111, 113, 130, 151 and 153, MS 130 is located in a cell boundary area between cells 100 and 150, i.e. in a handover region. When MS 130 moves to cell 150 managed by BS 140 during signal transmission/reception to/from BS 110, the serving BS of MS 130 changes from BS 110 to BS 140.

In the above BWA communication system (i.e: IEEE 802.16), the ranging channel is used as an uplink random access channel. Initial ranging, periodic ranging, and bandwidth request ranging are performed through the ranging channel. Particularly, the initial ranging is performed during network entry or when system information is lost, with the aim to acquire uplink synchronization. In the initial ranging, a BS calculates the Round Trip Delay (RTD) between the BS and an MS by accurately measuring the time of arrival of a ranging signal from the MS and notifies the MS of a timing offset corresponding to the RTD. The BS also allocates a primary management CID and a basic CID to the ranging-requesting MS, for use in network entry and control message transmission/reception.

In the initial ranging process in which the BS allocates the CIDs to the ranging-requesting MS, upon power-on, the MS first acquires system synchronization by receiving a downlink preamble from the BS. Being synchronized to system timing, the MS receives DL (Downlink)-MAP and Downlink Channel Descriptor (DCD) messages and acquires downlink channel characteristic information from the received messages. The MS then receives Uplink MAP (UL-MAP) and Uplink Channel Descriptor messages from the BS and acquires initial ranging opportunity information, uplink channel characteristic information, and initial ranging-associated parameters.

Once the MS acquires minimum uplink and downlink channel information required for communicating with the BS in this way, it performs a basic access procedure, i.e. ranging to the BS based on the acquired information. That is, the MS sends a Ranging Request (RNG-REQ) message to the BS and the BS replies with a Ranging Response (RNG-RSP) message.

Since this initial ranging process precedes registration to the BS, neither the BS nor the MS has connection-associated information. Therefore, the MS uses an initial ranging CID as its CID. The initial ranging CID is preset to a value (e.g. 0x0000), common to all MSs and thus it is not managed separately.

Besides the initial ranging CID, the BWA communication system uses a plurality of other CIDs listed in Table 1 below.

TABLE 1

| CID | Value |
| --- | --- |
| Initial Ranging CID | 0x0000 |
| Basic CID | 0x0001~m |
| Primary Management CID | m + 1~2m |
| Transport CID | 2m + 1~0xFE9F |
| Multicast CID | 0xFEA0~0xFEFE |

Referring to Table 1, the initial ranging CID is used for the MS to attempt an initial access to the BS during the initial ranging process, as stated before.

The CIDs other than the initial ranging CID can be classified into two types according to their allocation processes and meanings: management CID and data transport CID.

The basic CID and the primary management CID are management CIDs and the transport CID is a data transport CID. The management CIDs are allocated to the MS from the BS without complicated service negotiations or requirements during registration since the management CIDs are basically allocated to the MS for registration to the BS irrespective of the service that the MS uses.

The transport CID is allocated to the MS from the BS whenever the MS needs a new connection. The transport CID allocation takes place when specific service class requirements are fulfilled by negotiations. Now a description will be made of the functions of the CIDs illustrated in Table 1.

The basic CID is MS-specific. As long as a connection is maintained between the BS and the MS, the basic CID can be used instead of the Media Access Control (MAC) address of the MS. After the initial ranging, the MS and the BS exchange control messages using the basic CID.

The primary management CID is used during network entry. The network entry process, which starts with the initial ranging process, can be defined as a series of processes in which the MS registers its information with the BS, inclusive of MS registration, service negotiation, and Internet Protocol (IP) address allocation. The BS identifies the MS by the primary management CID during the network entry process and significant control messages are sent/received using the primary management CID during communications between the BS and the MS. As with the basic CID, the primary management CID is kept for the MS as long as the connection is maintained between the MS and the BS.

The transport CID is used for actual service data transmission/reception. Upon completion of the network entry, the MS requests a service to the BS and the BS allocates the transport CID to the MS for use in transmission/reception of service data. The connection of the service is identified by the transport CID as long as the service continues. Unlike the primary management CID and the basic CID, the transport CID is allocated on a service basis each time the MS requests a service. Hence, in the case where the MS requests a plurality of services simultaneously, such as voice call, video, and Internet browsing, the MS can be allocated a plurality of transport CIDs. On the other hand, the primary management CID and the basic CID are allocated to the MS on a one-to-one basis.

The multicast CID is used to multicast the same data to a plurality of MSs simultaneously. When the BS sends data using the multicast CID, the MSs to which the multicast CID was allocated receive the data, considering that the data are for them.

A description will be made of messages involved in the initial ranging process.

Table 2 below illustrates the structure of the RNG-REQ message sent from the MS to the BS.

TABLE 2

| Syntax | Size | Note |
|---|---|---|
| RNG-REQ_Message_Format( ) { | | |
| Management Message Type=4 | 8 bits | |
| Downlink Channel ID | | |
| TLV Encoded Information { | Variable | TLV specific |
| SS MAC Address | | |
| Requested Downlink Burst Profile | 8 bits | |
| MAC Version | | |
| Ranging Anomalies | | |
| AAS broadcast capability | | |
| } | | |
| } | | |

As noted from Table 2, the RNG-REQ message includes a plurality of Information Elements (IEs). Management Message Type is set to 4, indicating that the transmitted message is RNG-REQ. SS MAC Address is the MAC address of the MS, identifying the MS. Downlink Channel ID indicates the downlink channel on which the MS has received the UCD message providing uplink channel information. Requested Downlink Burst Profile is divided into bits 0 to 3 and bits 4 to 7. A Downlink Interval Usage Code (DIUC) is written in the bits 0 to 3 to request formats for transmission/reception of physical channel signals (e.g. a modulation type and an error correction type), and four Least Significant Bits (LSBs) of Configuration Change Count in the UCD message referred to in order to request ranging is filled in the bits 4 to 7. That is, the BS sends a predefined physical channel signal to the MS referring to the information provided in the bits 0 to 3 of Requested Downlink Burst Profile. MAC Version indicates a MAC version that the MS will use. Ranging Anomalies indicates whether the MS transmits at a maximum power level or at a minimum power level to attempt an access to the BS. Besides, Ranging Anomalies can be used to carry a response to an instruction regarding the increase or decrease of transmit/reception power to correct the transmit/reception power and time information of the MS during the initial ranging. AAS broadcast capability indicates whether the MS can receive a broadcast message or not.

Table 3 illustrates the structure of the RNG-RSP message sent from the BS to the MS.

TABLE 3

| Syntax | Size | Note |
|---|---|---|
| RNG-RSP_Message_Format( ) { | | |
| Management Message Type=5 | 8 bits | |
| Uplink Channel ID | | |
| TLV Encoded Information { | Variable | TLV specific |
| SS MAC Address | 6 | |
| Downlink Operational Burst Profile | 2 | |
| Primary Management CID | 2 | |
| Basic CID | 2 | |
| Ranging Status | 4 | 1 = continue |
| | | 2 = abort |
| | | 3 = success |
| | | 4 = rerange |
| Timing adjust | 4 | |
| Power level adjust | 1 | |
| Downlink frequency override | 4 | Center frequency at which MS redoes initial ranging |
| } | | |
| } | | |

Referring to Table 3, the RNG-RSP message includes a plurality of IEs. Management Message Type is set to 5, indicating that the transmitted message is RNG-RSP. SS MAC Address is the MAC address of the MS to receive RNG-RSP. Downlink Operational Burst Profile is a response to the MS-requested downlink burst profile, i.e. a DIUC to be used in the BS. Primary Management CID and Basic CID are CIDs that are allocated to the MS and kept for connection management between the BS and the MS while the MS receives a service after ranging. Ranging Status (1 to 4) is a response to the MS's ranging request. If Ranging Status is 1, this implies that the BS directs the MS to continue ranging. If Ranging Status is 2, this implies that the BS directs the MS to discontinue ranging. If Ranging Status is 3, this implies that the ranging is successful. If Ranging Status is 4, this implies that the BS directs the MS to retry ranging. Timing adjust provides information for correcting the timing of the MS and Power level adjust provides information for correcting the transmit/reception power of the MS. Downlink frequency override indicates the frequency of another channel on which the MS will attempt initial ranging, if Ranging Status is set to 2, indicating abort.

As noted from Table 3, the MS is allocated the primary management CID and the basic CID during the initial ranging process.

Since signaling is carried out between the BS and the MS via a direct link, a highly reliable radio communication link can be established between them in the typical BWA communication system illustrated in FIG. 1. However, due to the fixedness of the BS, a wireless network cannot be configured with flexibility. As a result, the BWA communication system is not effective in providing communication services under a radio environment experiencing fluctuating traffic distribution and great change in the number of required calls.

This drawback may be overcome by applying a multi-hop relay data transmission scheme using fixed Relay Stations (RSs), mobile RSs, or general MSs to general cellular wireless communication systems such as the IEEE 802.16e communication system.

The multi-hop relay wireless communication system can rapidly reconfigure a network according to a changing communication environment and can enable efficient operation of the whole wireless network. It can expand cell coverage and increase system capacity. In the case where the channel status between the BS and the MS is poor, an RS is installed between them so that the resulting establishment of a multi-hop relay path through the RS renders the available radio channel to the MS better. With the use of the multi-hop relay scheme at a cell boundary where the channel status is poor, high-speed data channels become available and the cell coverage is expanded.

The configuration of a multi-hop relay BWA communication system designed to expand the coverage area of the BS will be described below.

FIG. 2 illustrates the configuration of a multi-hop relay BWA communication system designed to expand the coverage area of the BS.

Referring to FIG. 2, the multi-hop relay BWA communication system includes a BS 210 for managing a cell 200, a plurality of MSs 211 and 212 within cell 200, a plurality of MSs 221, 222 and 223 managed by BS 210 but located in an area 230 outside cell 200, an RS 220 for providing a multi-hop relay path between BS 210 and MSs 221, 222 and 223. Signaling is performed in OFDM/OFDMA among BS 200, RS 220, and MSs 211, 212, 221, 222 and 223.

Although MSs 211 and 212 within cell 200 and RS 220 can communicate directly with BS 210, direct communication is not available between BS 210 and MSs 221, 222 and 223 outside cell 200. Therefore, RS 220 covering area 230 relays signals between BS 210 and MSs 211, 222 and 223. Thus MSs 221, 222 and 223 exchange signals with BS 210 via RS 220.

However, individual transmission of a transport CID and data from the BS to each of MSs through the same RS requires as many management messages.

Accordingly, a CID management apparatus and method are needed which reduces the management messages sent through the RS for data transmission to the MSs via the RS and thus saves bandwidth.

That is, there is a need for a CID management apparatus and method that efficiently manage data destined for the RS and data to be relayed to the MSs through the RS by use of a CID during communications between the BS and the RS in the multi-hop relay BWA communication system.

SUMMARY OF THE INVENTION

An aspect of the present invention is to address at least the problems and/or disadvantages and to provide at least the advantages described below. Accordingly, an aspect of the present invention provides an apparatus and method for sending data destined for a plurality of MSs in one payload through an RS in a multi-hop relay BWA communication system.

Another aspect of the present invention provides an apparatus and method for sending data destined for a plurality of MSs in one payload through an RS by use of a CID indicating inclusion of data with different destinations in one payload in a multi-hop relay BWA communication system.

In accordance with an aspect of the present invention, there is provided a data transmission method of a source in a multi-hop relay network, in which a CID of a destination of at least one packet is detected, it is determined from the CID if the destination is connected to an RS, a payload including at least one packet is generated, if the destination of the one packet is connected to the RS, a relay packet is generated by attaching a relay CID as a header to the payload, the relay CID indicating that the payload includes a packet for at least one destination, and the relay packet is sent.

In accordance with another aspect of the present invention, there is provided a CID management method of an RS in a multi-hop relay wireless access communication system, in which a CID of received data is detected, it is then determined whether the CID is a relay CID. The relay CID indicates that a payload includes a packet destined for at least one destination; data is separated from the payload of the received data with respect to each CID included in the payload. If the CID of the received data is the relay CID, CIDs of the separated data are checked, and if the checked CIDs include a CID of a destination to which the RS is to relay, separated data corresponding to the CID of the destination is sent to the destination.

In accordance with another aspect of the present invention, there is provided a source in a multi-hop relay wireless access communication system. In the source, a CID manager generates a payload by combining data to be sent to at least one destination via the same RS, generates a relay packet by attaching a relay CID as a header to the payload, the relay CID indicating that the payload includes a packet for at least one destination, and sends the relay packet to the RS.

In accordance with another aspect of the present invention, there is provided an RS in a multi-hop relay wireless access communication system. In the RS, a CID manager detects the CID of received data, determines if the CID is a relay CID, the relay CID indicating that a payload includes a packet destined for at least one destination. The CID manager separates data from the payload of the received data with respect to each CID included in the payload. If the CID of the received data is the relay CID, the CID manager checks the CIDs of the separated data, and if the checked CIDs include a CID of a destination to which the RS is to relay, sends the separated data corresponding to the CID of the destination to the destination.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF PREFERRED EMBODIMENTS

The matters such as detailed construction and elements defined in the description are provided to assist in a better understanding of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

As an example, a multi-hop relay BWA communication system operates in OFDM/OFDMA. As a physical channel signal is delivered on a plurality of subcarriers, the OFDM/OFDMA operation enables high-speed data transmission. Also, the MS's mobility is supported because the multi-hop relay BWA communication system is configured in a multi-cell structure.

While the following description is made in the context of the BWA communication system, it is to be clearly understood that the present invention is applicable to any multi-hop relay cellular communication system.

Figure 1:
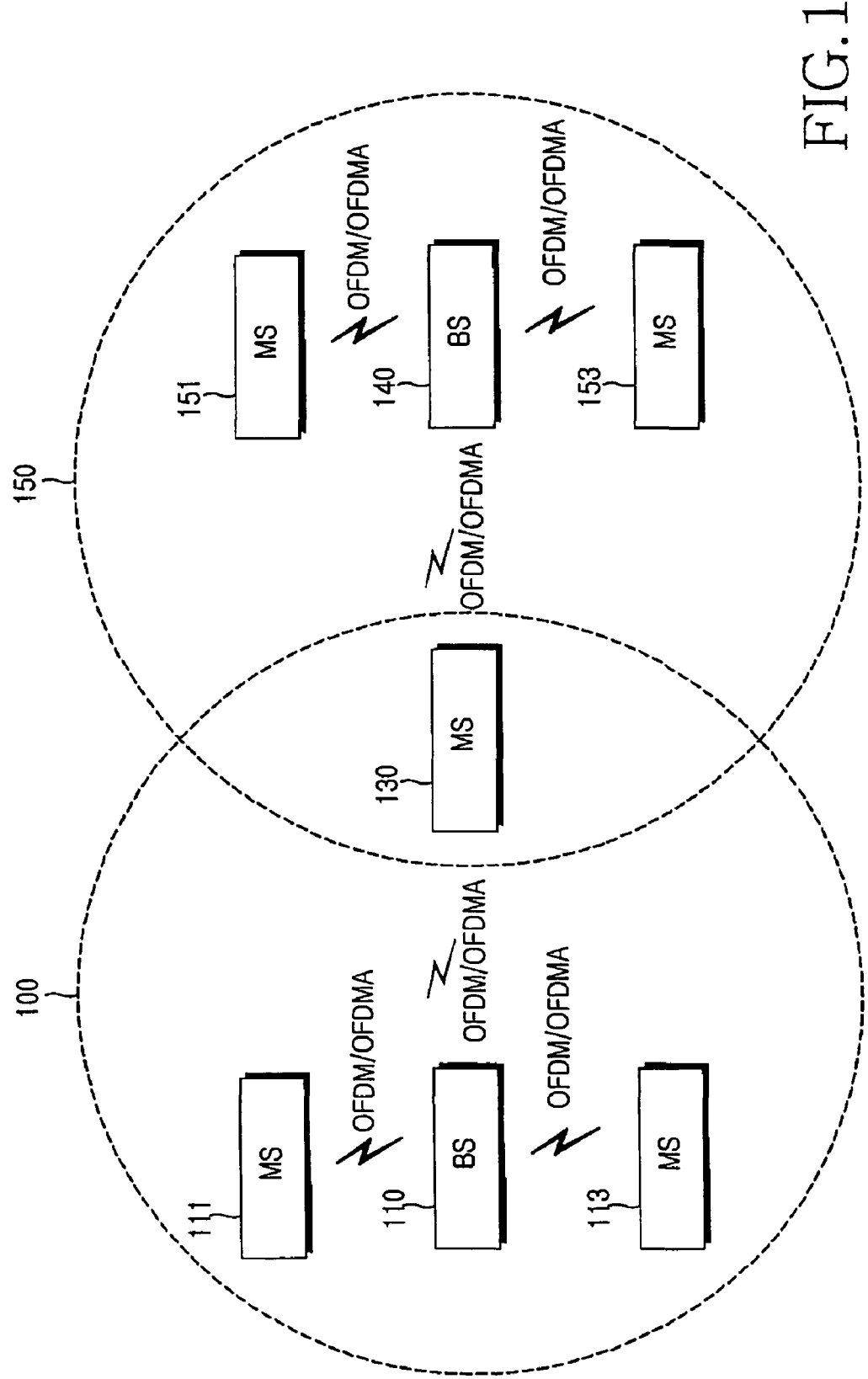
FIG. 1 illustrates the configuration of a typical BWA communication system.
Figure 2:
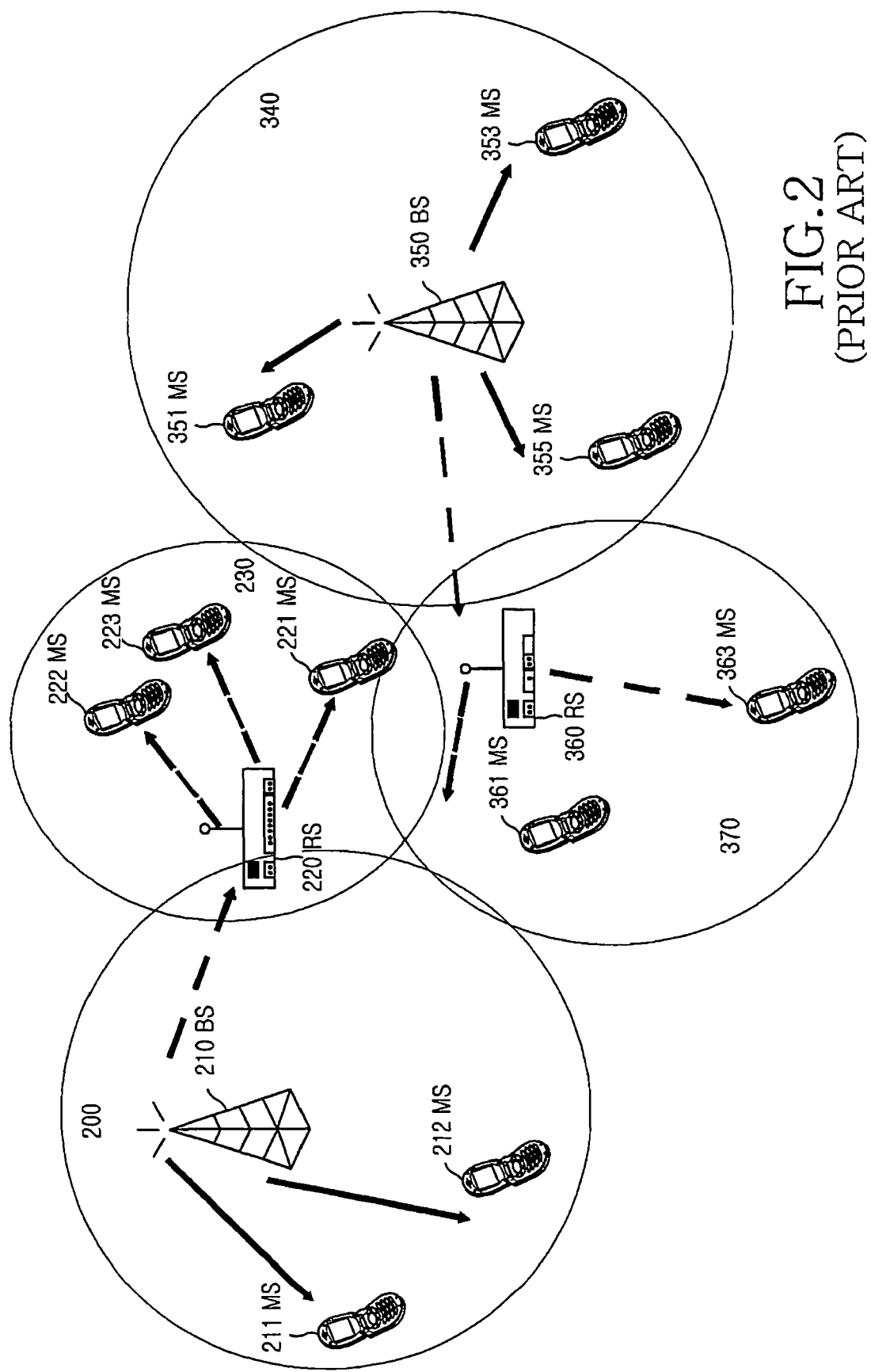
FIG. 2 illustrates the configuration of a typical multi-hop relay BWA communication system designed to expand BS coverage.
Figure 3:
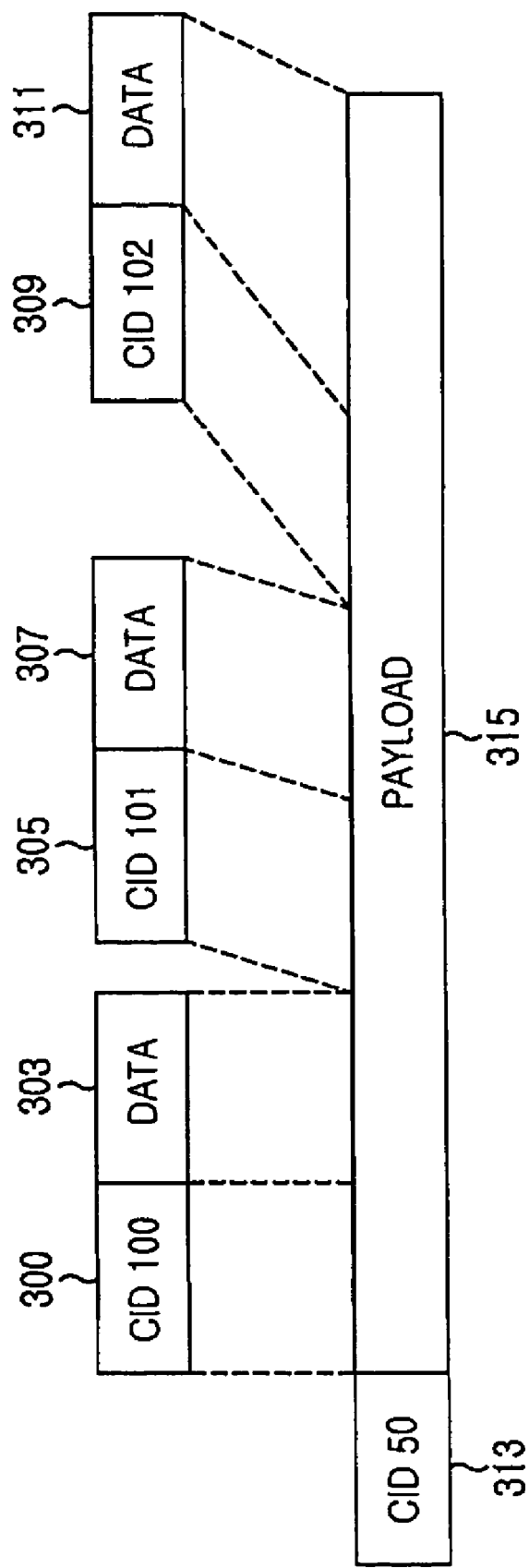
FIG. 3 illustrates the structure of a frame for data transmission/reception to/from an RS in a multi-hop relay BWA communication system according to the present invention.

Referring to FIG. 3, the frame includes a relay CID 313 and payload 315. The following description is made with the understanding that BS 210 sends packets to MSs 221, 222 and 223 outside cell 200 via RS 220 in FIG. 2.

Relay CID 313 has been allocated to the RS by the BS, for use in indicating that payload 315 contains data destined from the BS to a plurality of MSs.

Payload 315 includes transport CIDs identifying the MSs and data to be sent to the MSs. For example, CID 100 denoted by reference numeral 300 is the transport CID of a first MS and DATA 303 is data to be sent to the first MS. CID 101 denoted by reference numeral 305 is the transport CID of a second MS and DATA 307 is data to be sent to the second MS. CID 102 denoted by reference numeral 309 is the transport CID of a third MS and DATA 311 is data to be sent to the third MS.

If the BS sends three data to the three MSs in the BWA communication system as illustrated in FIG. 3, it sends them to the RS in one payload. In relation to the payload, the BS sends one management message to the RS, thus saving bandwidth, as compared to sending as many management messages as individual transmissions of the three data. That is, one management message suffices for the transmission of the three data in the single payload, resulting in bandwidth saving.

The RS is allocated the relay CID from the BS during network entry or Dynamic Service Addition (DSA) in the BWA communication system.

Figure 4A:
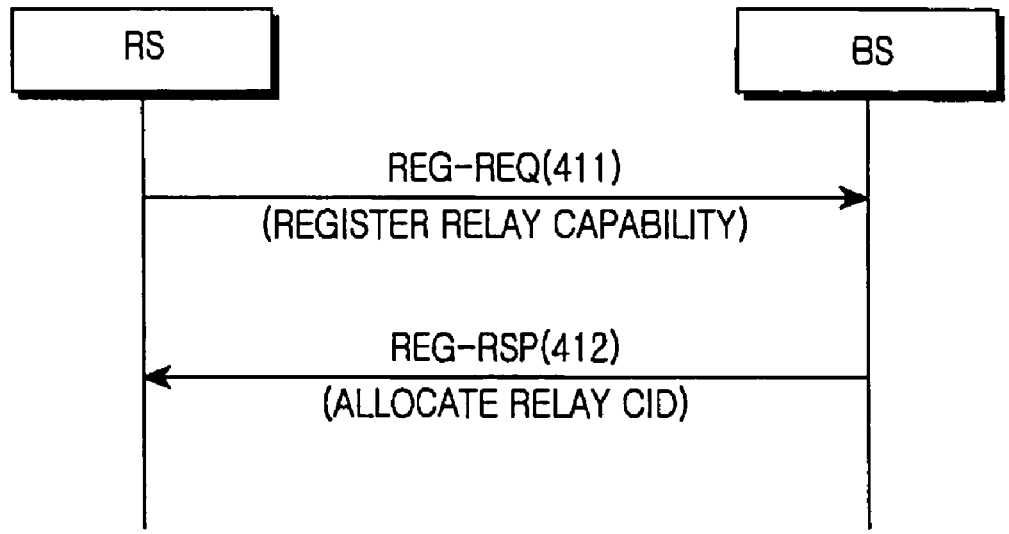
FIGS. 4A and 4B are flow diagrams showing signal flows in which the RS is allocated a relay CID from a BS in the multi-hop relay BWA communication system according to the present invention.

In accordance with the present invention illustrated in FIG. 4A, the RS can be allocated a relay CID during registration in the network entry process. In accordance with an alternative embodiment of the present invention illustrated in FIG. 4B, the RS can be allocated a relay CID during basic capabilities negotiation in the network entry process.

Referring to FIG. 4A, the RS sends a Registration Request (REG-REQ) message to the BS, requesting registration of relay capability in step 411. By the REG-REQ message, the RS may send a parameter or Type, Length, Value (TLV) indicating that it will support the relay capability and request allocation of the relay CID.

In step 412, the BS replies to the RS with a Registration-Response (REG-RSP) message confirming the support of the relay capability. At the same time, the BS may allocate the relay CID to the RS.

Figure 4B:
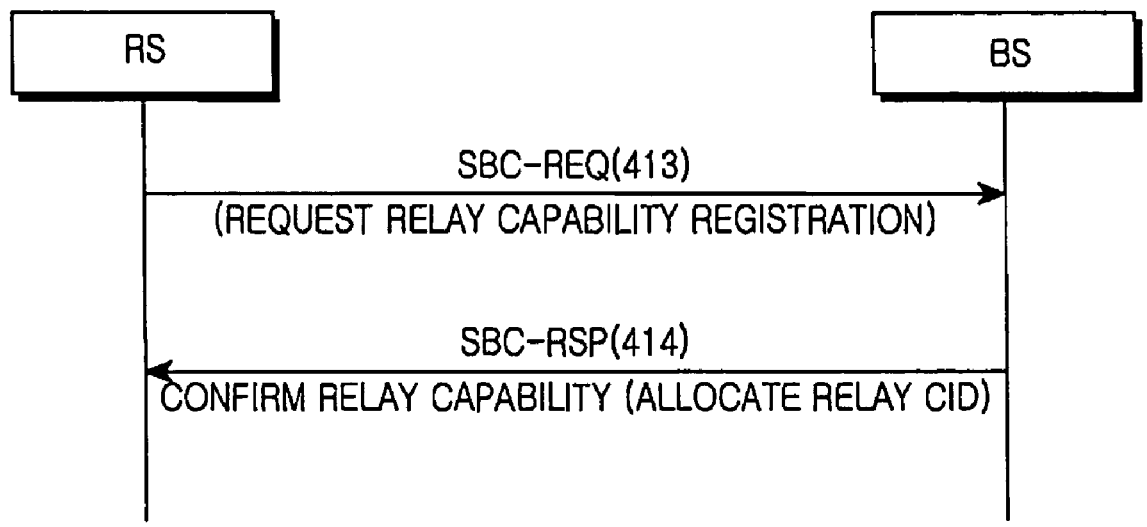

Referring to FIG. 4B, the RS requests support of relay capability to the BS when it negotiates about basic capabilities by sending a Subscriber Basic Capability (SBC) Request (SBR-REQ) message in step 413.

The BS confirms the support of the relay capability and allocates the relay CID to the RS by an SBC Response (SBC-RSP) message in step 414.

In this way, when the RS requests the support of the relay capability to the BS by the SBC-REQ message during the basic capabilities negotiation, the BS confirms or rejects the support of the relay capability by the SBC-RSP message. If the BS confirms the relay capability support, it may allocate the relay CID to the RS.

In one embodiment, the BS can manage a CID table by adding the relay CID to the existing Table 1, as follows.

TABLE 4

| CID | Value |
| --- | --- |
| Initial Ranging CID | 0x0000 |
| Basic CID | 0x0001~m |
| Primary Management CID | m + 1~2m |
| Relay CID | 2m + 1~z |
| Transport CID | Z + 1~0xFE9F |
| Multicast CID | 0xFEA0~0xFEFE |

Referring to Table 4, the initial ranging CID is used for the RS to attempt an initial access to the BS during an initial ranging process. The basic CID is a CID specific to the RS, allocated from the BS. The primary management CID is used during network entry. The relay CID indicates inclusion of data destined for a plurality of MSs in one payload. The transport CID is used for transmission/reception of actual service data. The multicast CID is used to multicast the same data to a plurality of MSs simultaneously.

In other embodiment, the BS can choose the relay CID from other CIDs such as the transport CID or Multicast CID in the existing Table 1.

It has been described above that the RS is allocated the relay CID from the BS during the REG-REQ/RSP process or the SBC-RREQ/RSP process.

Figure 5:
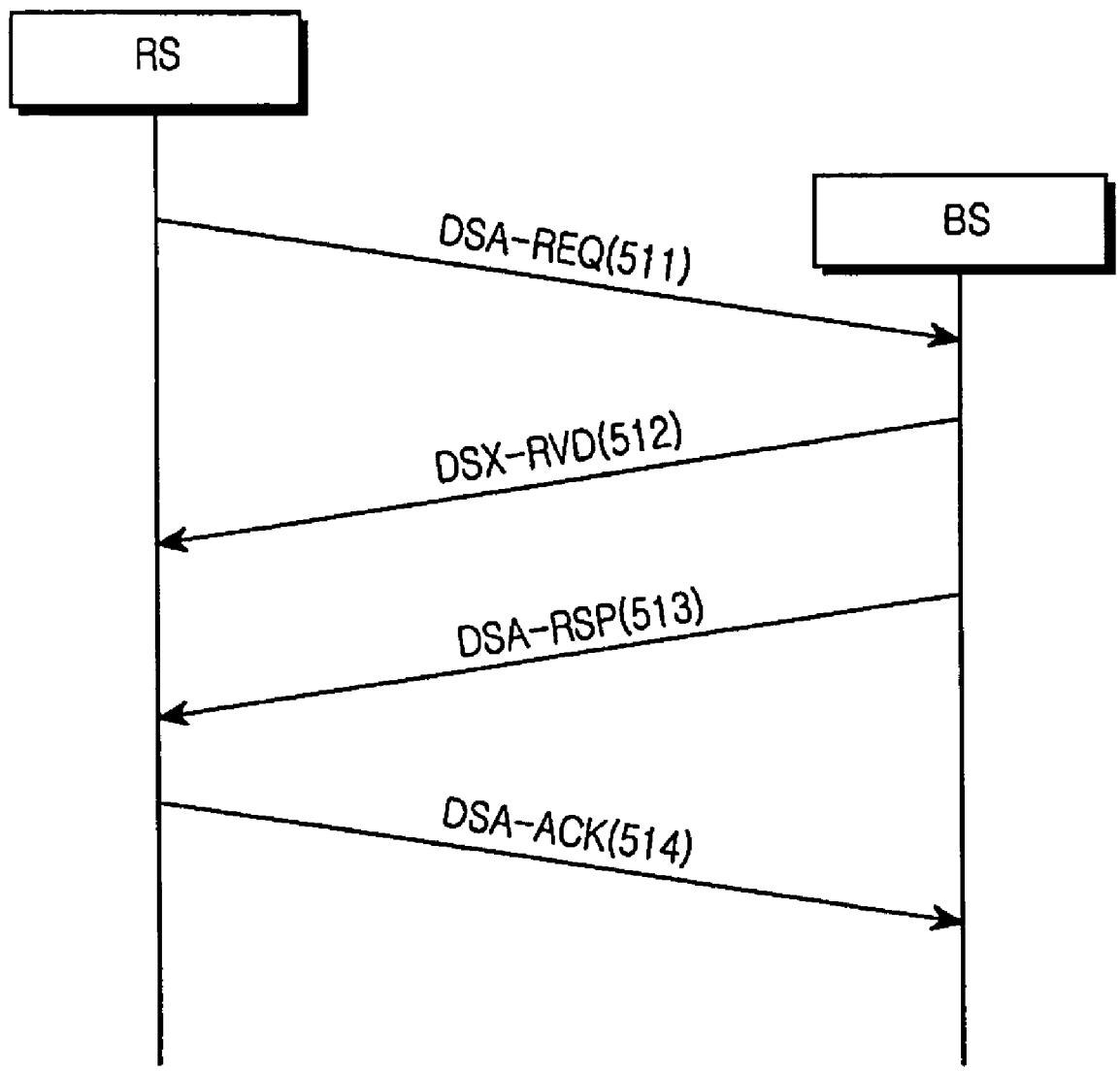
FIG. 5 is a flow diagram showing a signal flow in which the RS is allocated a relay CID from the BS in the multi-hop relay BWA communication system according to the present invention.

Referring to FIG. 5, the RS requests a connection setup for new data transmission to the BS by a DSA Request (DSA-REQ) message in step 511. At the same time, the RS requests allocation of the relay CID to the BS by the DSA-REQ message. Independently of the process in which the RS requests the relay capability support to the BS and the BS confirms the relay capability support, the RS is allocated the relay CID instead of a transport CID during a DSA process in which typically, the transport CID is allocated. The DSA process is for initiating a service request to the BS for data communication after the registration of the RS with the BS.

In step 512, the BS sends, for example, a DSx Received (DSX-RVD) message to the RS informing it that it has received the DSA-REQ message.

The BS then sends a DSA Response (DSA-RSP) message in response to the DSA-REQ message in step 513. The DSA RSP message contains the relay CID allocated to the RS.

Upon receipt of the DSA-RSP message, the RS detects the relay CID and acknowledges the DSA-RSP message to the BS by a DSA Acknowledgement (DSA-ACK) message in step 514.

Figure 6:
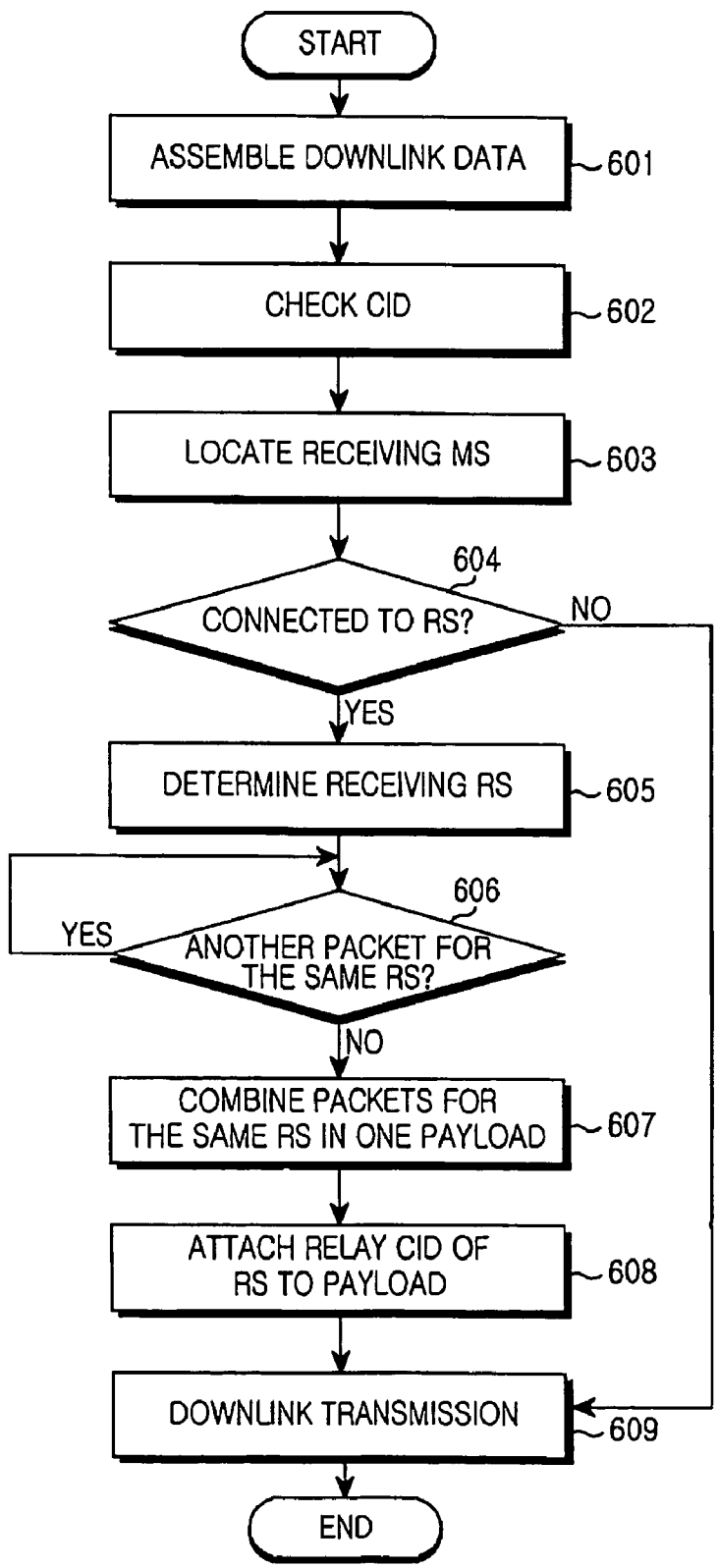
FIG. 6 is a flowchart of a communication operation of the BS in the multi-hop relay BWA communication system according to the present invention.

Referring to FIG. 6, the BS forms the first packet by assembling downlink data in step 601. The data assembly is performed on an MS-by-MS basis.

The BS checks the CID of the MS to receive the first packet in step 602, locates the MS in step 603, and determines if the MS is connected to any RS in step 604.

If the MS is not connected to any RS, the BS sends the first packet to the MS in step 609.

On the other hand, if the MS is connected to an RS, the BS identifies the RS to receive the first packet, i.e. the RS connected to the MS in step 605.

The BS then determines if there is any other packet to be sent through the RS. The BS checks the presence of such packets until no packets remain to be sent through the RS. This operation involves steps 601 to 605 in which the BS detects the CIDs of MSs and identifies RSs connected to the MSs to receive the packets.

In the presence of a plurality of packets to be sent to the RS, the BS combines the packets in one payload in step 607. For example, the payload is formed by combining data packets with the CIDs of MSs in their headers, as shown in FIG. 3.

The BS attaches a header with the relay CID of the RS to the payload in step 608 and sends the payload with the relay CID to the RS in step 609.

In the case where data for a plurality of MSs are combined in one payload, a plurality of payloads may be formed each including data for an MS depending on the size of a frame sent from the BS to the RS.

The relay CID may be a management CID allocated to the RS for communicating with the BS during registration, or a data transport CID allocated to the RS by the BS on request when needed. The RS is an infrastructure RS which is fixed or a client RS which is an MS acting as an RS.

Figure 7:
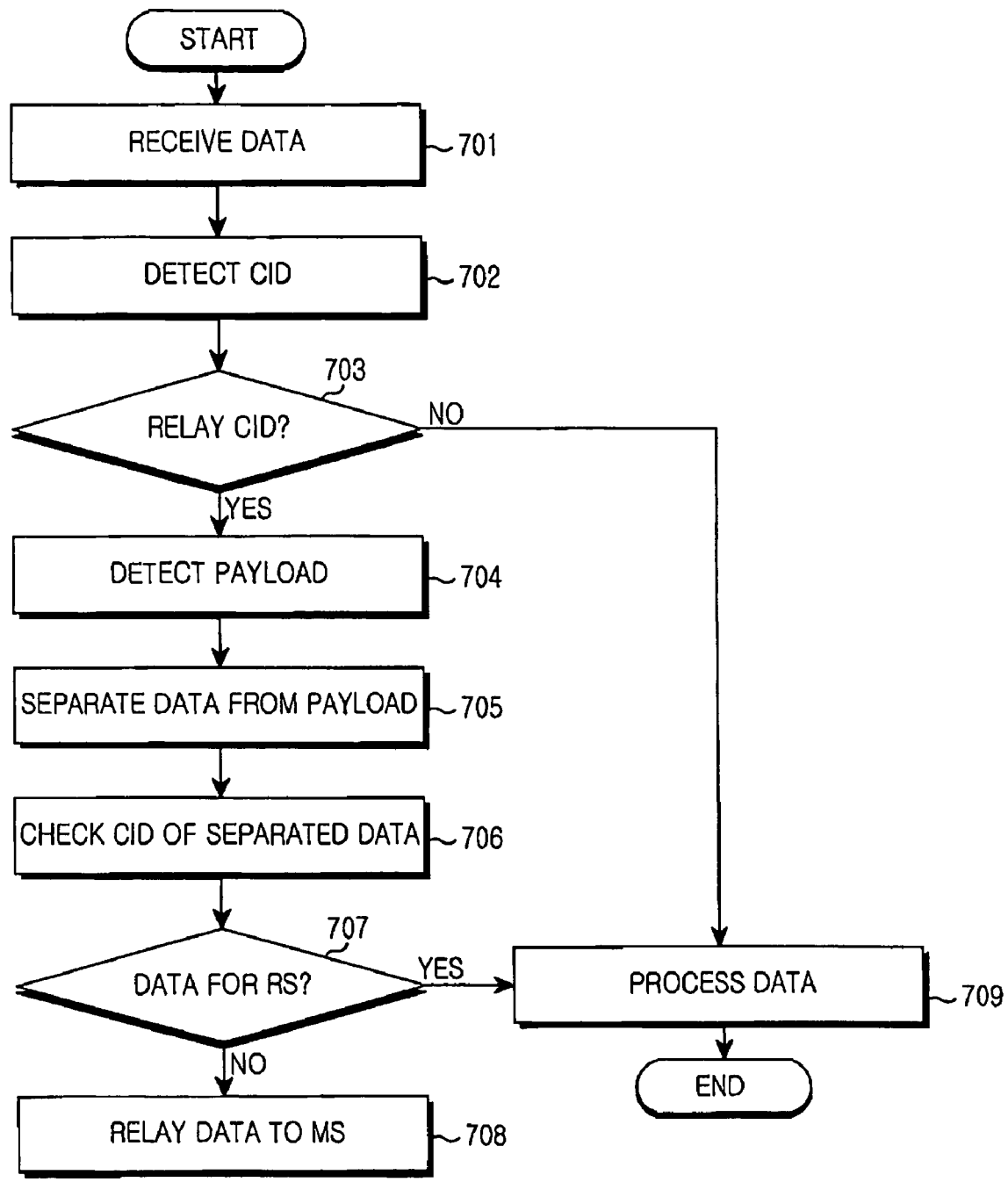
FIG. 7 is a flowchart illustrating a communication operation of the RS in the multi-hop relay BWA communication system according to the present invention.

Referring to FIG. 7, upon receipt of data from the BS in step 701, the RS detects the CID of the data in step 702.

In step 703, the RS determines whether the CID is its relay CID. If the CID is not the relay CID, the RS processes the data in step 709.

On the contrary, if the CID is the relay CID, the RS detects the payload of the data in step 704 and separates data on a CID basis in step 705. The RS checks the CIDs of the separated data in step 706 and determines whether the CIDs are for MSs to which the RS is to relay data in step 707.

For CIDs identifying MSs connected to the RS, the RS sends data with the CIDs set in their headers to the MSs in step 708.

For a CID identifying the RS, the RS processes data with the CID in its header in step 709.

The relay CID may be a management CID allocated to the RS for communicating with the BS during registration, or a data transport CID allocated to the RS by the BS on request when needed. The RS is an infrastructure RS which is fixed or a client RS which is an MS acting as an RS.

In the above-described preferred embodiments of the present invention, the BS forms a payload with data to be sent to a plurality of MSs through the same RS and sends the payload to the RS. While not shown, however, the BS may include a BS CID manager for forming the payload and attaching the relay CID of the RS to the payload, for transmission to the RS.

When receiving data including the relay CID, the RS separates data from the payload with respect to each CID included in the payload, for relaying the separated data to MSs. While not shown, however, the RS includes an RS CID manager for performing the data separation and for sending the separated data to the MSs if the CIDs of the separated data are for the MSs connected to the RS.

In both the BS and the RS, the relay CID may be a management CID allocated to the RS for communicating with the BS during registration, or a data transport CID allocated to the RS by the BS on request when needed. The RS is an infrastructure RS which is fixed or a client RS which is an MS acting as an RS.

While transmission of downlink data to be sent to a plurality of MSs via the same RS in one payload in the BWA communication system has been described in the preferred embodiments of the present invention, it is to be clearly understood that the present invention is also applicable to the uplink.

As described above, the present invention provides an apparatus and method for managing a relay CID when a BS communicates with a plurality of MSs via an RS in a multi-hop relay BWA communication system. The relay CID includes data destined for the RS. Data to be relayed through the RS can be managed separately. Therefore, required management messages are reduced, bandwidth is saved, and efficient communications is enabled. Also, the BS and the RS can be configured to include the relay CID management apparatus and to perform the CID management method.

While the invention has been shown and described with reference to certain preferred embodiments of the present invention, it will be understood by those skilled in the art that various changes in form and details may be made therein without departing from the spirit and scope of the present invention as further defined by the appended claims and their equivalents.

What is claimed is:

1. A method in a wireless communication system, said system comprising terminals, at least one Base Station (BS) and at least one Relay Station (RS), said method for transmitting data packets from a BS to at least one terminal, the method comprising:
    detecting a Connection Identifier (CID) assigned to a terminal of a data packet;
    determining if the terminal of the data packet is connected to an RS based on the detected CID of the data packet;
    if the terminal of the data packet is connected to the RS, adding the CID of the data packet and data of the data packet to a payload including a data packet and an associated CID to be sent to another terminal connected to the same RS; and
    generating a relay packet by attaching a relay CID as a header to the payload, and sending the relay packet to the RS.

2. The method of claim 1, wherein the BS allocates the relay CID to the RS during registration of the RS with the BS.

3. The method of claim 1, wherein the BS allocates the relay CID to the RS during basic capabilities negotiation between the RS and the BS.

4. The method of claim 1, wherein the BS allocates the relay CID to the RS on request, when the RS needs the relay CID.

5. The method of claim 1, wherein the relay CID is allocated to the RS by the BS on request during a Dynamic Service Addition (DSA) process between the RS and the BS.

6. The method of claim 1, further comprising sending the data packet from the BS to the terminal, if the terminal of the data packet is not connected to the RS.

7. The method of claim 1, wherein the RS is one of an infrastructure RS and a client RS.

8. A method for receiving data packets from at least one Base Station (BS) and then transmitting the data packets to a plurality of terminals in a wireless communication system including the plurality of terminals, the at least one BS, and at least one Relay Station (RS), the method comprising:
    receiving a relay packet including a relay Connection Identifier (CID) and a payload, wherein the payload includes data packets and associated CIDs to be sent to each of the plurality of terminals, respectively;
    separating data from the payload of the received relay packet with respect to the relay CIDs;
    checking the CIDs of the separated data packets; and transmitting separated data to each of the plurality of terminals based on the checked CIDs.

9. The method of claim 8, wherein the at least one BS allocates the relay CID to an RS during registration of the RS with the at least one BS.

10. The method of claim 8, wherein the at least one BS allocates the relay CID to an RS during basic capabilities negotiation between the RS and the at least one BS.

11. The method of claim 8, wherein the at least one BS allocates the relay CID to an RS on request.

12. The method of claim 8, wherein the relay CID is allocated to an RS by the at least one BS on request during a Dynamic Service Addition (DSA) process between the RS and the at least one BS.

13. The method of claim 8, further comprising processing the received relay packet, if the received relay packet does not include the relay CID.

14. The method of claim 8, further comprising, processing separated data corresponding to a CID of an RS if the checked CID is for the RS itself.

15. The method of claim 8, wherein the at least one RS is one of an infrastructure RS and a client RS.

16. An apparatus in a wireless communication system, said system comprising terminals, at least one Base Station (BS) and at least one Relay Station (RS), said apparatus for transmitting data packets from a BS to at least one terminal, the apparatus comprising:
   means for adding a Connection Identifier (CID) of a data packet and data of the data packet for a terminal to a payload including a data packet and an associated CID intended to be sent to another terminal connected to the same RS;
   means for generating a relay packet by attaching a relay CID as a header to the payload; and
   means for sending the relay packet to the RS.

17. An apparatus in a wireless communication system, said system comprising a plurality terminals, at least one Base Station (BS), and at least one Relay Station (RS), said apparatus for receiving data packets from the at least one BS and then transmitting the data packets the terminals, the apparatus comprising:
   means for receiving a relay packet including a relay Connection Identifier (CID) and a payload, wherein the payload includes data packets and associated CIDs to be sent to each of the plurality of terminals, respectively;
   means for separating data from the payload of the received relay packet with respect to the relay CIDs;
   means for checking the CIDs of the separated data packets; and
   means for transmitting separated data to each of the plurality of terminals based on the checked CID.

18. The apparatus of claim 17, wherein an RS is allocated the relay CID by a Base Station (BS) during registration of the RS with the BS.

19. The apparatus of claim 17, wherein an RS is allocated the relay CID by a BS during basic capabilities negotiation between the RS and the BS.

20. The apparatus of claim 17, wherein an RS is allocated the relay CID by a BS on request.

21. The apparatus of claim 17, wherein a BS on request allocates the relay CID to an RS during a Dynamic Service Addition (DSA) process between the RS and the BS.

22. The apparatus of claim 17, wherein an RS is one of an infrastructure RS and a client RS.

23. A wireless communication system for managing Connection Identifiers (CIDs), comprising:
   a Base Station (BS) for generating a payload including data destined for a Relay Station (RS) and data to be sent to a plurality of terminals through the RS, the data destined for the RS and the data to be sent to the plurality of terminals through the RS being distinguished by CIDs, attaching a relay CID as a header to the payload, the relay CID indicating the payload includes packets for each of the plurality of terminals, respectively, and sending the payload with the relay CID to the RS; and
   the RS for separating data from the payload of the received data with respect to each of the CIDs included in the payload, checking the CIDs of the separated data, and sending, if the checked CIDs include a CID of a terminal to which the RS is to relay, separated data corresponding to the CID of the terminal to the terminal, if payload received from the BS has the relay CID.

24. The wireless communication system of claim 23, wherein the RS is one of an infrastructure RS and a client RS.

* * * * *